July 11, 1967  A. L. TROUTNER  3,330,087
LONG SPAN, HIGH LOAD, COMPOSITE TRUSS JOIST
Filed Dec. 31, 1963  2 Sheets-Sheet 1
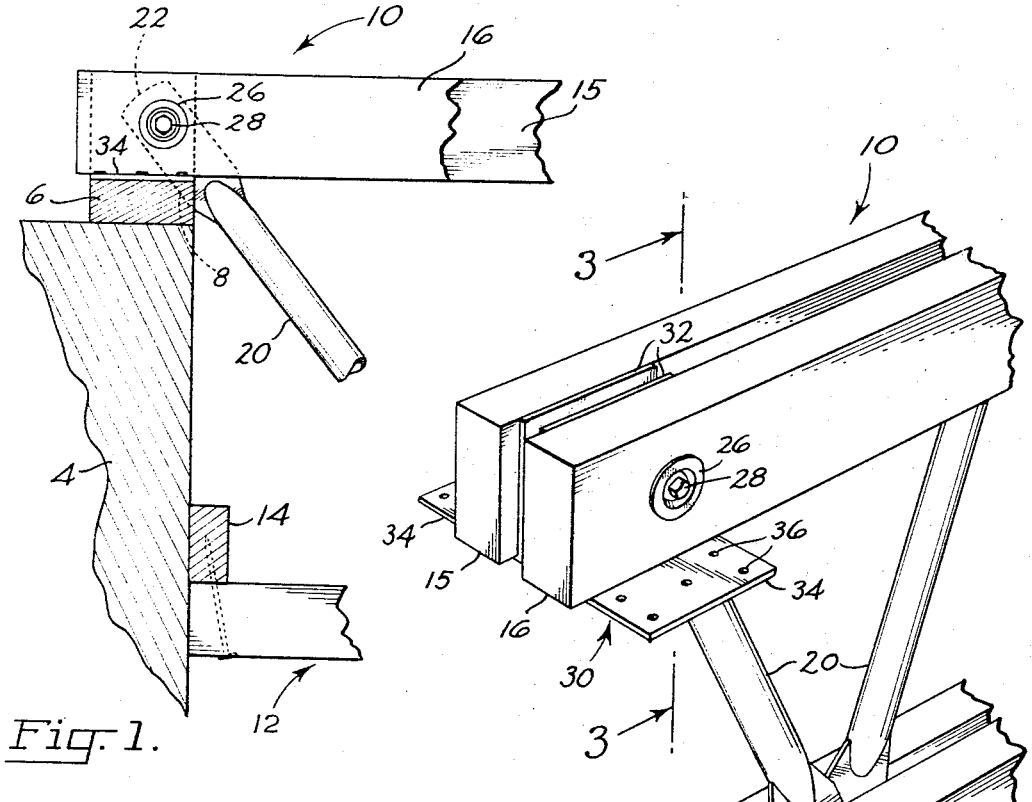
Fig. 1.
Fig. 2.
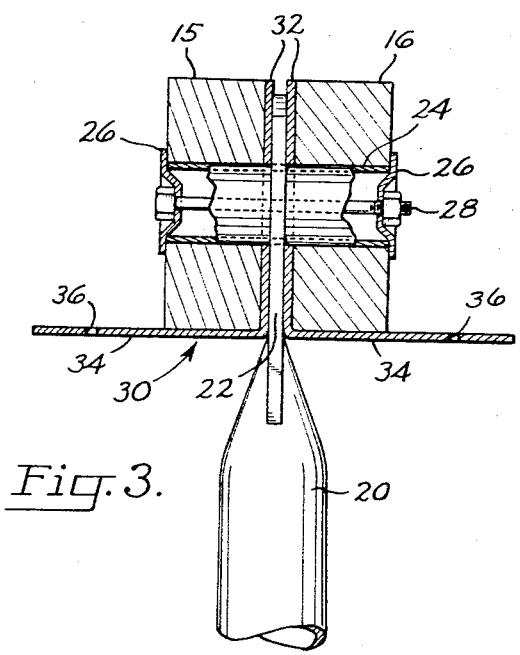
Fig. 3.
Arthur L. Troutner
INVENTOR.
BY [signature]
Atty.

July 11, 1967     A. L. TROUTNER     3,330,087
LONG SPAN, HIGH LOAD, COMPOSITE TRUSS JOIST
Filed Dec. 31, 1963     2 Sheets-Sheet 2

Arthur L. Troutner
INVENTOR.

BY Eugene O Farley

Atty.

United States Patent Office 3,330,087
Patented July 11, 1967

3,330,087
LONG SPAN, HIGH LOAD, COMPOSITE
TRUSS JOIST
Arthur L. Troutner, Skyline Drive, Boise, Idaho 83702
Filed Dec. 31, 1963, Ser. No. 334,705
Claims priority, application Canada, Sept. 14, 1963,
884,551
5 Claims. (Cl. 52—693)

This application is a continuation-in-part of my copending application, Ser. No. 60,371, filed Oct. 4, 1960, now Patent No. 3,137,899 for Composite Truss, the same being a continuation-in-part of application Ser. No. 714,284, filed Feb. 10, 1958 for Composite Truss Joist, now Patent No. 3,019,491.

This invention relates to truss joists designed to carry heavy loads, and to span substantial distances. It pertains particularly to a long span, high load composite truss joist supported between a pair of bearing walls and composed of vertically spaced chords interconnected by a plurality of link members arranged in zig-zag disposition between the chords.

It is conventional practice in building construction to erect side walls having bearing plates along their upper surfaces. Joists or beams are laid upon the bearing plates, spanning the space between opposite side walls. A floor, roof or decking then is laid across the joists.

In view of the increasing scarcity of long timbers from which structural joists and beams are made, and the high cost of laminated beams, it has become increasingly important to provide a joist which is strong and available in long spans at relatively low cost.

It accordingly is the general object of the present invention to provide a composite truss joist capable of supporting heavy loads over a long span of, for example, 100 feet, or even longer.

It is another important object of this invention to provide a high load, long span joist which may be factory assembled from ordinary lumber and metal tubing; which is light in weight; and which is erected easily on the building site, without the necessity of using power equipment.

The long span, high load composite truss joist of the invention broadly comprises a pair of vertically spaced chords adapted to span the space between two opposite bearing walls by which the chords are supported. Each chord comprises two juxtaposed lumber pieces, for example, two 2 x 4's or two 2 x 6's, placed on edge, side by side parallel to each other.

A plurality of links are arranged in zig-zag relation between the chords, with the ends of adjacent links overlapping each other and extending between the lumber pieces comprising the chords. Registering openings are provided through the lumber pieces and through each pair of overlapped link ends. Pin means penetrate the registering openings, securing the links to the pieces, and securing the pieces to each other.

In the drawings:

FIG. 1 is a fragmentary view in elevation of the herein described composite truss joist, illustrating the manner of supporting it on a bearing wall;

FIG. 2 is a fragmentary, perspective view of a length of the joist showing its constructional features;

FIG. 3 is a transverse sectional view, taken along line 3—3 of FIG. 2 and illustrating the construction of pin connectors employed in assembling the joist;

Figure 4:
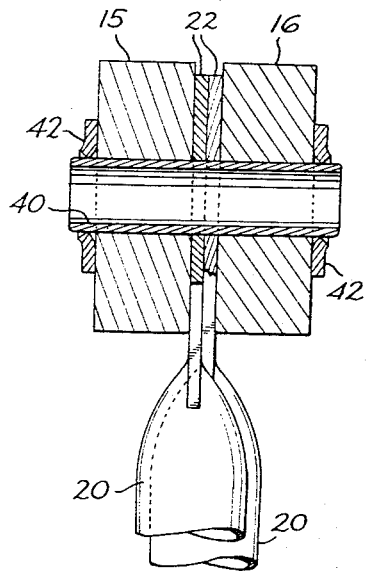
Figure 5:
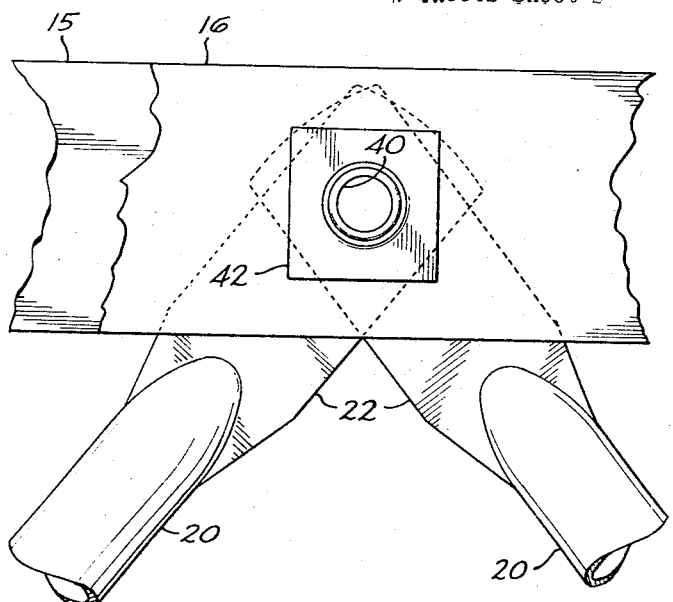
Figure 6:
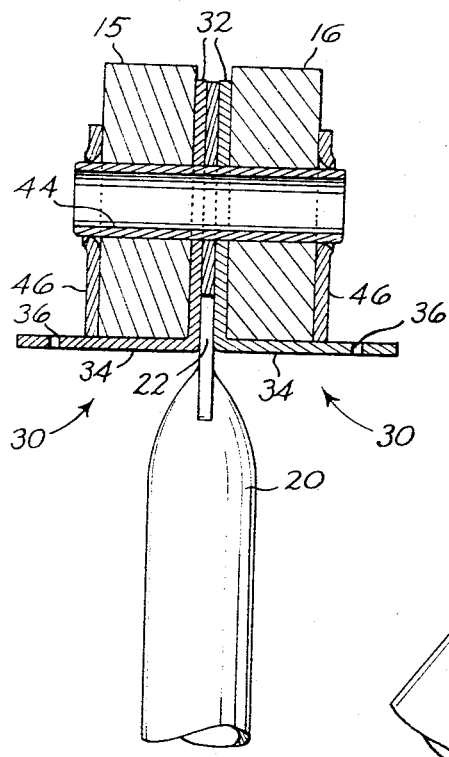
Figure 7:
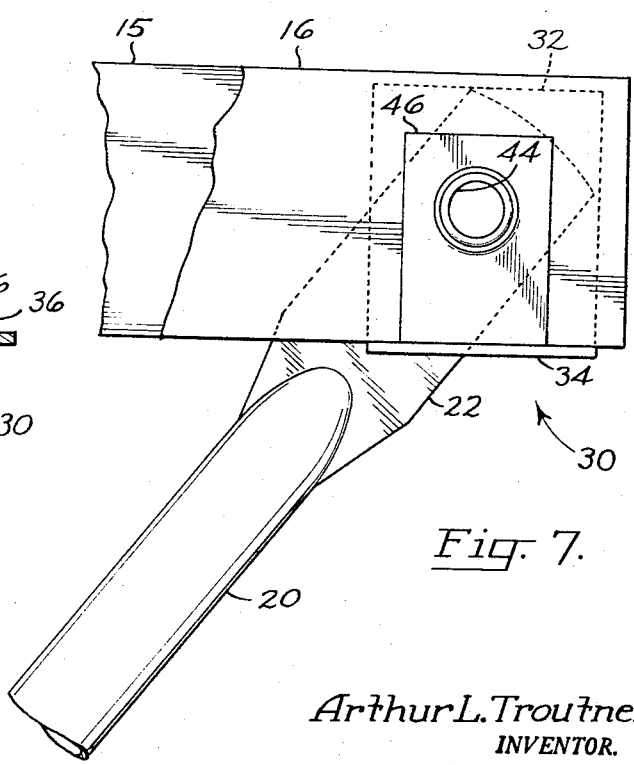

FIGS. 4 and 6 are transverse sectional views similar to FIG. 3 but illustrating the construction of alternate pin connectors employed in assembling the joist at intermediate and terminal joints, respectively; and FIGS. 5 and 7 are views in side elevation of the pin connectors of FIGS. 4 and 6.

As illustrated in FIG. 1, the truss joists of my invention are supported in parallel spaced arrangement between a pair of bearing walls, one of which is indicated at 4. The bearing walls may be of wood, concrete, or masonry construction. A wooden or other bearing plate 6 lies across the top of each bearing wall. The bearing plate is notched to provide notches 8 at spaced intervals, there being one notch for each of the joists.

Each joist is composed of an upper chord indicated generally at 10, and a lower chord, indicated generally at 12. Upper chord 10 is longer than lower chord 12. Its ends overlie and are supported by the bearing plate.

Lower chord 12 is slightly shorter than the distance between the walls spanned by the joists. It is not supported directly thereby, but is nailed or otherwise fastened to a stabilizing strip 14 mounted on the inside surface of bearing wall 4.

To supply the requisite strength and length, each of chords 10, 12 is a composite of two structural pieces placed side by side, parallel to each other and spaced apart horizontally to provide an intermediate space of sufficient width to accommodate the linking members.

Thus upper chord 10 may be a composite of 2 x 6 pieces 15, 16 placed on edge. Similarly, lower chord 12 may be a composite of 2 x 4 pieces 17, 18 placed on edge.

Upper chord 10 and lower chord 12 are interconnected by a lacing of link members arranged in zig-zag fashion with their ends overlapped. Each link member comprises a metal tube 20 having transversely perforated flattened ends 22. The latter are of such a thickness that, when overlapped, they may be inserted in the space between the pieces comprising each chord, as shown particularly in FIG. 2.

At spaced, offset intervals the upper and lower chords are cross bored to form openings which register with the perforations through the flattened ends 22 of the link members. Pin means are inserted through the registering openings to interconnect the link members and chords, as well as to secure together the component pieces of each chord. The construction of the pin means employed is illustrated particularly in FIG. 3.

As illustrated in that figure, each pin means comprises a hollow cylinder 24 dimensioned for snugly fitting reception in the cross bores through the lumber pieces and the perforations through the flat link ends. The ends of the cylinder are flush with the exterior side faces of the chord.

Inwardly dished washers 26 overlie the open ends of the cylinder. The washers are of sufficient diameter so that they overlie also a substantial area of the side faces of the chord.

A bolt 28 extends through the length of the cylinder with the head nesting in dished washer 26 on one side, and the nut nesting in dished washer 26 on the other side, of the chord. It will be apparent that upon tightening the bolts the entire assembly of lumber pieces and link members is secured in the desired structural relation so that it may be handled as a unit.

Upon mounting the assembled joist across the bearing walls, the ends of upper chord 10 are supported on bearing plate 6 and with the end of lower chord 12 abutting the inner side face of bearing wall 4.

Considerable stress then necessarily is transmitted by each terminal pin 24 against the substance of the chord immediately below it. The bearing stress thus exerted may damage the chord by crushing it. Means accordingly are provided for distributing the load.

In the illustrated form of the invention the load distributing members are indicated generally at 30. They are termed herein "bearing clips" and serve the function of distributing the load to avoid excess stress at the bearing points of the pins in the side grain bearing of the chords. They also anchor the joist in place on the bearing plate which it overlies.

Each bearing clip comprises a right angled metal plate having vertical and horizontal sections.

The horizontal section 34 of each bearing clip is sufficiently long completely to underlie and extend outwardly from the under surface of upper chord 10. The exposed portion of this section is provided with nail holes 36 by means of which it may be secured to bearing plate 6 by which it is supported.

Accordingly, the heavy tension or compression applied to terminal link member 20 is transferred first to pin 24, which it engages, and then to vertical sections 32 of bearing clips 30. These act as columns, transferring the load to horizontal sections 34 of the bearing clips, which in turn spread it across a substantial area of underlying bearing plate 6. The destructive action of pin 24 against chord 10 thus is eliminated. In addition, the truss assembly is anchored to the bearing plate.

The construction of alternate pin means which may be employed for assemblying the joists is illustrated in FIGS. 4–7 inclusive. Their application simplifies materially the assembly of the joists, without weakening the joist structure.

Two forms of alternate pin means are illustrated. In FIGS. 4 and 5 is illustrated the pin means which may be employed in fastening intermediate links to the chords. In FIGS. 6 and 7 is illustrated the pin means which may be used to fasten the terminal end of the terminal link to the top chord, which overlies the bearing wall.

As in the case of the previously described embodiment, the pin means is associated with an upper chord 10, which may be a composite of lumber pieces 15, 16 placed on edge, and with a lower chord 12 which may be a composite of lumber pieces 17 and 18, also placed on edge. The chords are interconnected by a lacing of link members 20 arranged zig-zag with flattened ends 22 overlapped and inserted between the lumber pieces.

Both the lumber pieces and the link ends are cross bored, with registering openings dimensioned to receive a pin which, in the illustrated form of the invention, comprises a hollow cylinder 40. This may be analogous in construction and material to pin 24 of the previously described embodiment. However, it is of sufficient length to extend beyond the planes of the side faces of the lumber pieces comprising the chord.

The lumber pieces are tied together by means of a pair of press-on washers 42. These are made of resilient steel and have a central opening the diameter of which is slightly smaller than the external diameter of pin 40.

Accordingly, when the washers are slipped over the projecting ends of pin 40 in the manner shown in FIG. 4, the margins of their central openings are spread slightly, whereupon the resiliency of the metal of which the washers are made causes the opening edges to dig into the exterior surface of the pin. This prevents removal of the washers and presses them tightly againts the adjacent side faces of the lumber pieces, securing the assembly together.

The pin means illustrated in FIGS. 6 and 7 is similar except that it is designed for application on the terminal end of terminal link 20, i.e. on the end secured to the terminal portion of upper chord 10, which overlies bearing plate 6. It functions not only to secure together the chord components, but also to transmit to the bearing plate the vertical load applied to the outer ends of the connecting pin.

This assembly is similar to that of FIGS. 4 and 5, except that there is included a pair of the above-described right angled bearing clips, each being indicated generally at 30 and each comprising a vertical section 32 and a horizontal section 34. The latter section of each clip underlies and extends beyond the associated lumber piece, and bears against plate 6, in the manner described above.

A pin 44, which preferably comprises a hollow metal cylinder, extends through registering openings through lumber pieces 15, 16, flattened end 22 of terminal link 20, and vertical portions 32 of bearing clips 30. Pin 44 is analogous to pin 40 of FIGS. 4 and 6, and is of sufficient length to extend a substantial distance beyond the plane of the outer side faces of lumber pieces 15, 16.

Press-on washers 46 are applied to the protruding ends of pin 44. These are analogous in function to washers 42 in securing together the components of the assembly. However, they serve the additional function of acting as columns which support the vertical load applied to the outer portions of pin 44.

Accordingly, washers 46 may comprise rectangular plates of such length that their lower edges are substantially coplanar with the lower edges of lumber pieces 15, 16. As a result, they bear directly against horizontal portions 34 of bearing clips 30 and are able to serve their load bearing function.

Washers 46 are provided with an upwardly offset opening having a diameter slightly less than the outside diameter of pin 44. Thus, when they are pressed over the ends of the pin, a press-lock fit is created which prevents withdrawal of the washers, and fastens together securely the various components of the assembly.

It accordingly will be seen that there is provided a long span, high load composite truss joist in which the several objects of this invention are achieved and which is well adapted to meet the conditions of practical use.

It is to be understood that the form of my invention herein shown and described is to be taken as a preferred example of the same and that various changes in the shape, size and arrangement of parts may be resorted to without departing from the spirit of my intention or the scope of the subjoined claims.

Having thus described my invention, I claim:

1. A composite truss joist comprising:
   (a) two vertically spaced chords dimensioned to span two horizontally spaced bearing walls,
   (b) each chord comprising two juxtaposed lumber pieces placed side by side, parallel to each other,
   (c) a plurality of metal links arranged in zig-zag relation between the chords with the ends of adjacent links overlapped and extending between the lumber pieces comprising the chords,
   (d) there being registering openings through the pieces and each pair of overlapped link ends,
   (e) metal pin means penetrating the registering openings, securing the links to each other and to the pieces, and
   (f) a pair of L-shaped metal bearing clips associated with the terminal link at each end of the upper chord and each having a transversely perforated vertical segment positioned between the lumber pieces of the chord with the terminal link positioned between said segments and the pin means extending through the assembly of lumber pieces, perforated segments and terminal link, each clip also having a laterally extending horizontal segment lapping the adjacent lumber piece for support upon the bearing wall.

2. The composite truss joist of claim 1 wherein each pin means comprises a pin and a pair of press-on washers, the pin having projecting end portions of uniform diameter and the washers being dimensioned for a press-lock friction gripping fit, one on each end portion of the pin, overlying the adjacent lumber piece surfaces and securing the pieces together.

3. A composite truss joist comprising:
   (a) two vertically spaced chords dimensioned to span two horizontally spaced bearing walls,
   (b) each chord comprising two juxtaposed lumber pieces placed side by side, parallel to each other,
   (c) a plurality of links arranged in zig-zag relation between the chords with the ends of adjacent links overlapped and extending between the lumber pieces comprising the chords, (d) there being registering openings through the pieces and each pair of overlapped link ends,
(e) and pin means penetrating the registering openings, securing the links to each other and to the pieces, each pin means comprising a hollow cylinder, a pair of washers and a bolt, the washers being arranged to cover both ends of the cylinder, overlying the adjacent lumber piece surfaces, and the bolt extending through the washers, interconnecting them and securing the two pieces comprising the chord.

4. A composite truss joist comprising:
(a) two vertically spaced chords dimensioned to span two horizontally spaced bearing walls,
(b) each chord comprising two juxtaposed lumber pieces placed side by side, parallel to each other,
(c) a plurality of links arranged in zig-zag relation between the chords with the ends of adjacent links overlapped and extending between the lumber pieces comprising the chords,
(d) there being registering openings through the pieces and each pair of overlapped link ends,
(e) and pin means penetrating the registering openings, securing the links to each other and to the pieces.
(f) the terminal pin means on each end of the joist comprising a pin, a pair of press-on washers pressed one on each end of the pin overlying the outer surfaces of the lumber pieces, the undersides of the washers being substantially coplanar with the undersides of the lumber pieces with which they are associated, thereby transmitting to the underlying bearing walls the vertical load exerted on the outer portions of the pin.

5. A composite truss joist comprising:
(a) two vertically spaced chords dimensioned to span two horizontally spaced bearing walls,
(b) each chord comprising two juxtaposed lumber pieces placed side by side, parallel to each other,
(c) a plurality of links arranged in zig-zag relation between the chords with the ends of adjacent links overlapped and extending between the lumber pieces comprising the chords,
(d) there being registering openings through the pieces and each pair of overlapped link ends,
(e) and pin means penetrating the registering openings, securing the links to each other and to the pieces,
(f) at each end of the joist a pair of right angled bearing clips interposed back to back between the lumber pieces underlying and extending beyond the same, bearing on the bearing walls, and penetrated by the pin means,
(g) the pin means comprising a pin, a pair of press-on washers pressed one on each end of the pin, overlying the outer surfaces of the lumber pieces, the undersides of the washers being substantially coplanar with the undersides of the pieces and bearing against the bearing clips, thereby transmitting to the bearing clips, and the bearing walls, the vertical load exerted on the outer portions of the pin.

References Cited

UNITED STATES PATENTS

| 752,655 | 2/1904 | Cook | 52—731 |
| 1,813,373 | 7/1931 | Wooldridge | 52—691 |
| 1,844,463 | 2/1932 | Dodd | 85—36 |
| 2,359,583 | 10/1944 | Reiner | 52—695 |
| 2,385,142 | 9/1945 | Lank | 52—693 |

FOREIGN PATENTS

| 518,233 | 1940 | Great Britain. |
| 813,729 | 1959 | Great Britain. |

FRANK L. ABBOTT, *Primary Examiner.*

R. A. STENZEL, *Assistant Examiner.*